United States Patent [19]
Roszhart

[11] Patent Number: 5,656,778
[45] Date of Patent: Aug. 12, 1997

[54] MICROMACHINED ACCELERATION AND CORIOLIS SENSOR

[75] Inventor: Terry V. Roszhart, West Paterson, N.J.

[73] Assignee: Kearfott Guidance and Navigation Corporation, Wayne, N.J.

[21] Appl. No.: 427,449

[22] Filed: Apr. 24, 1995

[51] Int. Cl.[6] .............. G01C 19/00; G01P 3/44; G01P 15/08
[52] U.S. Cl. .................. 73/504.04; 73/514.29
[58] Field of Search .............. 73/504.03, 504.04, 73/514.29, 504.02

[56] References Cited

U.S. PATENT DOCUMENTS

| | | |
|---|---|---|
| 3,614,678 | 10/1971 | Engeler et al. . |
| 4,230,953 | 10/1980 | Wilcox . |
| 4,488,131 | 12/1984 | Griffin et al. . |
| 4,945,765 | 8/1990 | Roszhart . |
| 5,001,933 | 3/1991 | Brand . |
| 5,018,858 | 5/1991 | Malvern . |
| 5,315,874 | 5/1994 | Petrovich et al. ............ 73/493 |
| 5,334,901 | 8/1994 | Albert et al. ............... 310/321 |
| 5,341,682 | 8/1994 | Hulsing, II ................. 73/505 |
| 5,349,316 | 9/1994 | Sterns . |

*Primary Examiner*—Hezron E. Williams
*Assistant Examiner*—Richard A. Moller
*Attorney, Agent, or Firm*—Klauber & Jackson

[57] ABSTRACT

A solid state silicon micromachined acceleration and Coriolis (MAC) sensor that measures linear and angular motion. The MAC sensor is a single device that performs the functions of a conventional accelerometer and a gyroscope simultaneously. The MAC sensor is unique in that it is a differential dual stage device using only one micromachined proof mass to measure both linear and angular motions. The single proof mass is connected to opposing electromechanical resonators in a monolithic microstructure made from single crystal silicon. This unique design offers improvements in measurement performance and reductions in fabrication complexity that are beyond the state the art of earlier micromachined inertial sensors.

13 Claims, 5 Drawing Sheets

MICROMACHINED ACCELERATION AND CORIOLIS SENSOR

FIELD OF THE INVENTION

The present invention relates generally to linear and angular motion sensors and, more particularly, to a solid state silicon micromachined acceleration and Coriolis sensor that measures linear and angular motion.

DESCRIPTION OF THE PRIOR ART

Previous attempts to develop inertial multisensors can be divided into three general categories. The first of these consists of a triad of accelerometers that are dithered about a common axis using a rotational or flexural mechanism. Since at least three accelerometers are being oscillated simultaneously, this approach usually requires the most volume and power. This method is not monolithic and considerable complexity of design is needed to make electrical contact with the individual vibrating accelerometers.

There is a second approach that uses two oppositely vibrating proof masses and two magnetically driven resonators to sense both rotational and linear motion. This approach uses a monolithic structure that controls the dither motion and the Coriolis response of the proof masses as well as the vibrational motion of the resonators. Since there are two proof masses, a mechanical "phase link" is also needed to assure anti-parallel proof mass motion. The monolithic nature of this structure is advantageous in relation to the benefits of batch micromachining methods but the integration of two proof masses in one sensor greatly increases the design complexity. This increased complexity imposes design limits that effect sensor performance and fosters a multitude of unwanted parasitic vibrational modes that impair measurement accuracy. The need for two proof masses also increases sensor power and volume.

A third category of devices consists of micromachined structures that exhibit two modes of vibration that are orthogonally oriented. As the device rotates about its sensitive axis, vibrations in one mode are coupled into the dual orthogonal mode. Measurements of the device rotation can then be made by sensing the magnitude of the vibration occurring in this second mode. Unfortunately, this second mode operates at the same frequency as the first mode. This means that small perturbations in mode orthogonality, fabrication tolerances, or electrical cross talk can also couple energy between modes. This produces an error signal that appears as a false rotation and reduces the accuracy of this type of sensor. In addition, this type of sensor is often insensitive to linear acceleration and cannot measure rotational and linear motions simultaneously.

SUMMARY OF THE INVENTION

The present invention contemplates a solid state silicon micromachined acceleration and Coriolis (MAC) sensor that measures linear and angular motion. The MAC sensor is a single device that performs the functions of a conventional accelerometer and a gyroscope simultaneously. Its primary application is in miniature inertial guidance and navigation systems where issues of size, weight, performance, and cost are important.

The MAC sensor is unique in that it is a differential dual stage device using only one micromachined proof mass to measure both linear and angular motions. The single proof mass is connected to opposing electromechanical resonators in a monolithic microstructure made from single crystal silicon. This unique design offers improvements in measurement performance and reductions in fabrication complexity that are beyond the state the art of earlier micromachined inertial sensors.

The MAC sensor retains all of the advantages of earlier types of solid state sensors. The MAC sensor has no rotating parts and its motion sensing assembly does not have any of the material interfaces or joints that contribute to measurement errors. It can be fabricated from existing micromachining processes and offers the economies of size, weight, and cost that are typical of the integrated circuit industry.

Since the MAC sensor can measure both linear and angular motions, only three MAC sensor chips are needed for a full six axis inertial measurement instrument. Alternate configurations are possible that can provide four and even six axes of measurement on a single chip. As a result, the MAC sensor has the potential to establish a new generation of advanced inertial guidance and navigation systems that are small, inexpensive, and well suited to applications requiring high levels of performance.

Accordingly, the primary objective of the present invention is to provide a solid state silicon micromachined acceleration and Coriolis (MAC) sensor that measures linear and angular motion.

Other objectives and advantages of the present invention will become apparent to those skilled in the art upon reading the following detailed description and claims, in conjunction with the accompanying drawings which are appended hereto.

BRIEF DESCRIPTION OF THE DRAWINGS

In order to facilitate a fuller understanding of the present invention, reference is now be made to the appended drawings. The drawings should not be construed as limiting the present invention, but are intended to be exemplary only.

DETAILED DESCRIPTION OF THE PRESENT INVENTION

I. MECHANICAL DESIGN

Figure 1A:
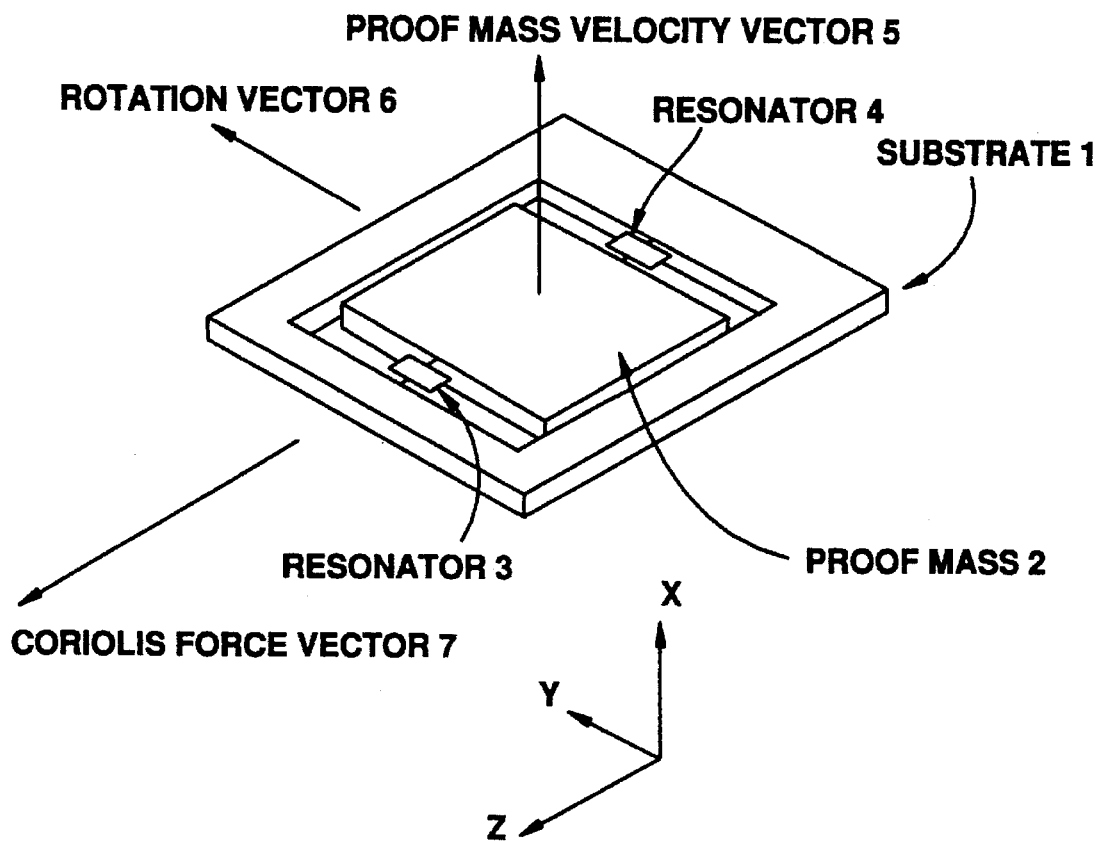
FIG. 1A is a top perspective view of a monolithic electromechanical structure of a solid state silicon micromachined acceleration and Coriolis (MAC) sensor according to the present invention.
Figure 1B:
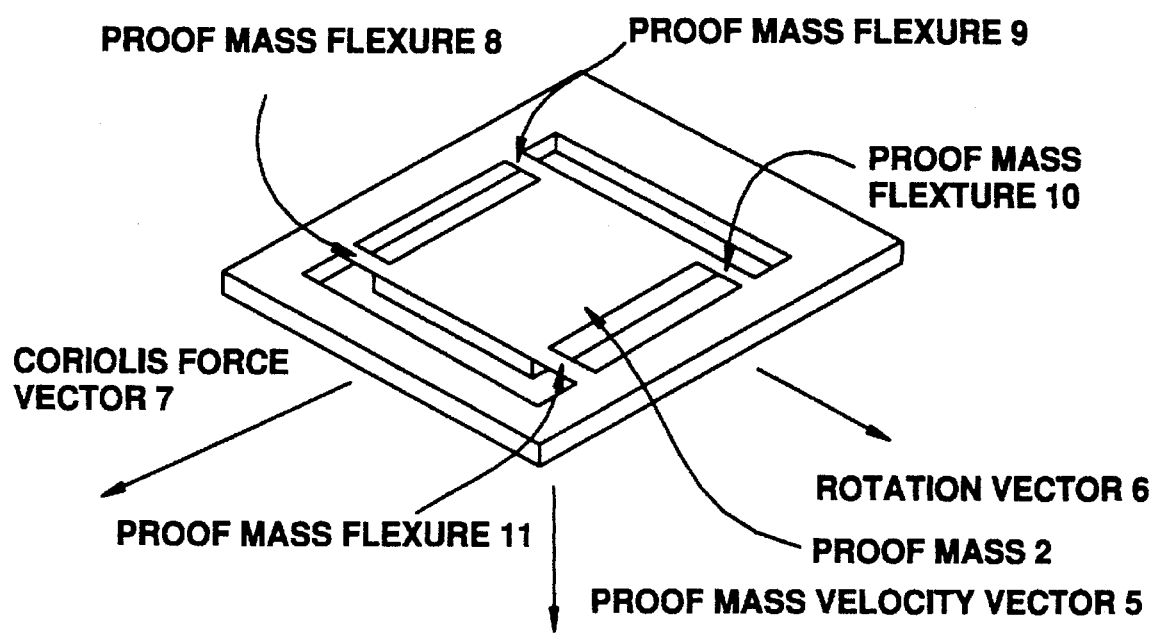
FIG. 1B is a bottom perspective view of the monolithic electromechanical structure shown in FIG. 1A.
Figure 2:
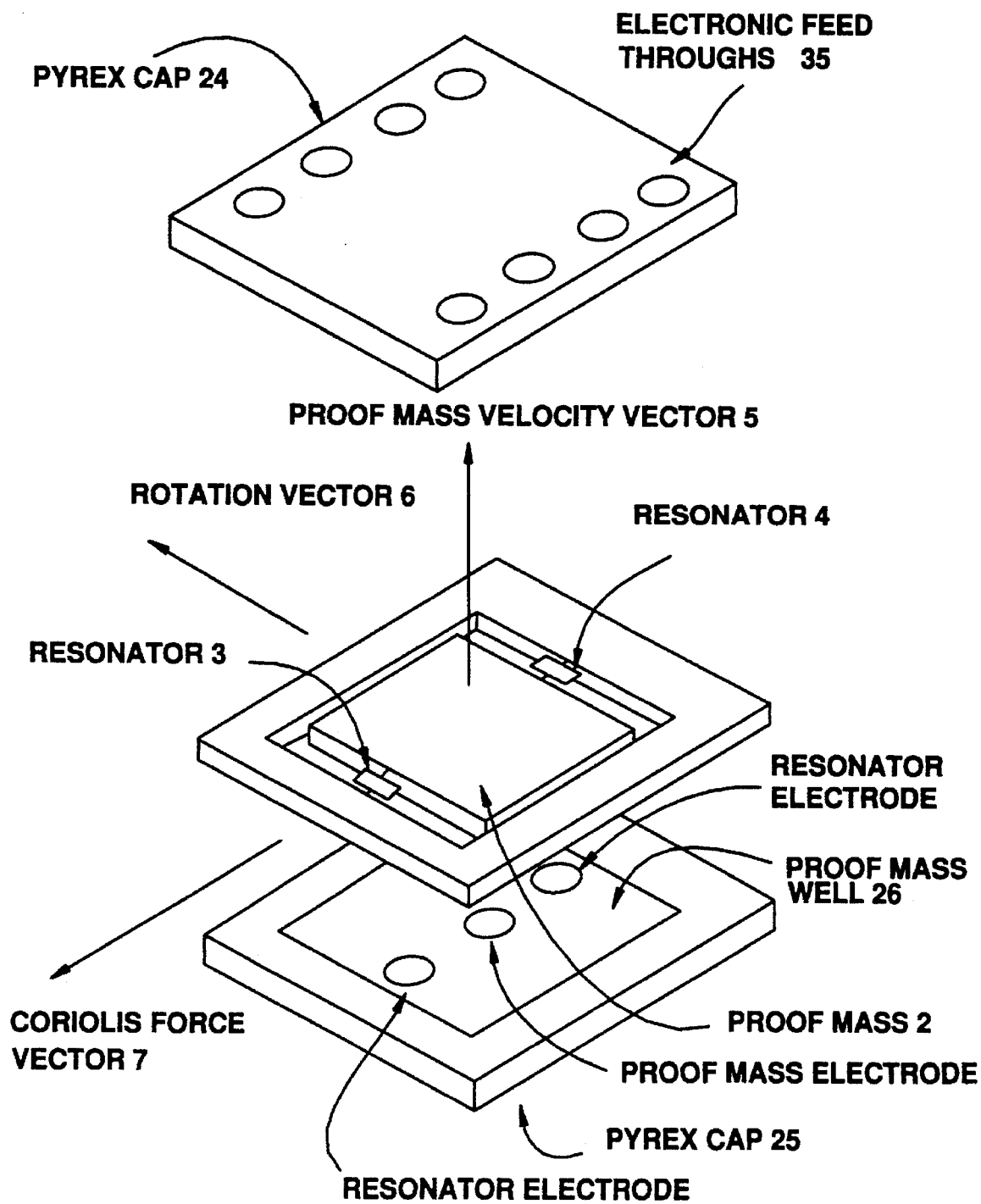
FIG. 2 is an exploded top perspective view of a solid state silicon micromachined acceleration and Coriolis (MAC) sensor chip assembly according to the present invention.
Figure 3:
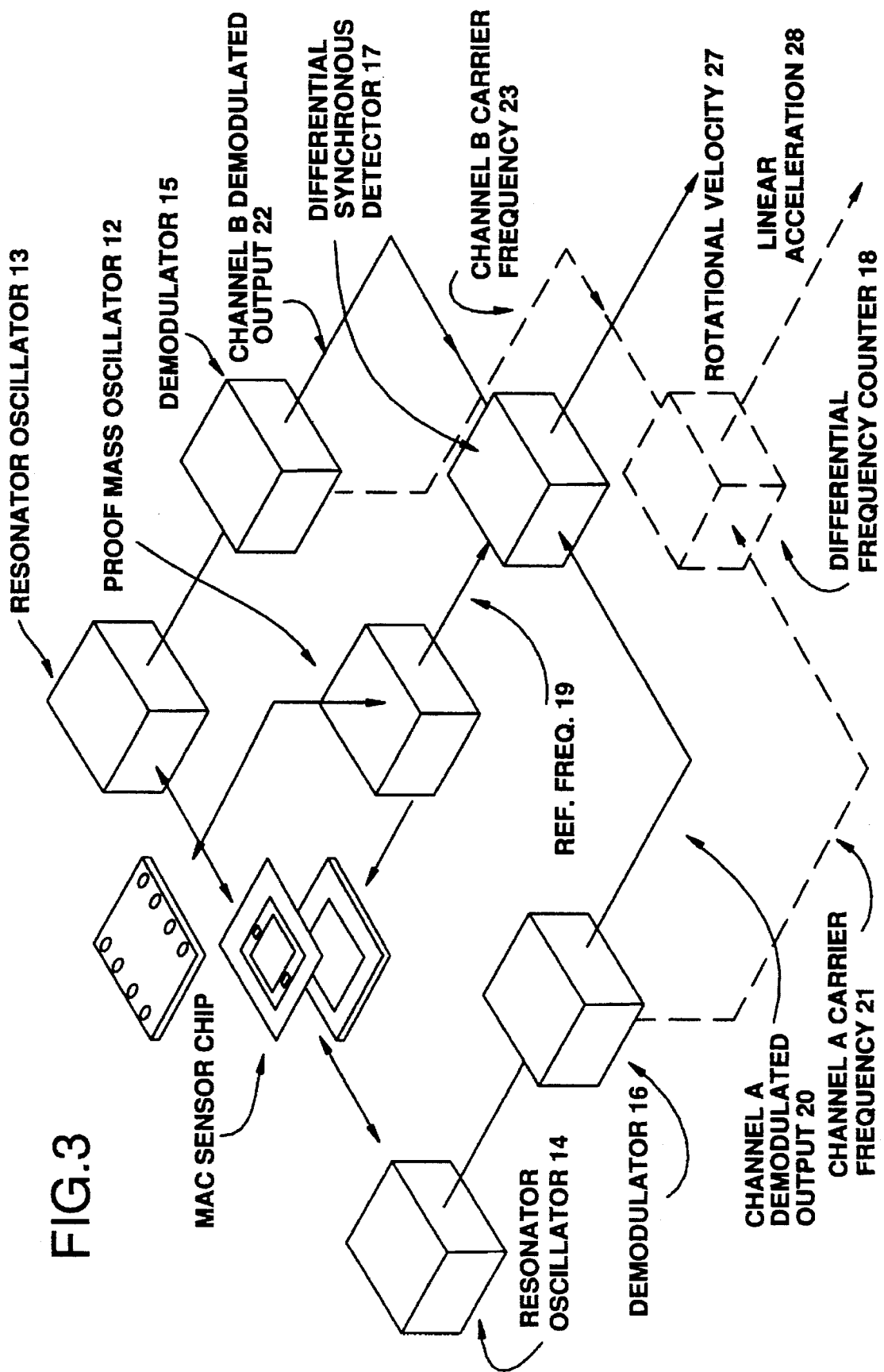
FIG. 3 is an exploded top perspective view of an electronic signal processing system for a solid state silicon micromachined acceleration and Coriolis (MAC) sensor according to the present invention.

The elements of a micromachined acceleration and Coriolis (MAC) sensor according to the present invention are shown in FIGS. 1–3. A monolithic electromechanical structure that is the central feature of the MAC sensor is shown in FIG. 1. This structure performs all the mechanical functions of the sensor. This structure is bonded into a microchip assembly that is connected to an electronic signal processing system. The details of the MAC sensor microchip are shown in FIG. 2, and an electronic signal processing system is shown in FIG. 3.

A. CHIP DESIGN

The electromechanical structure that is central to the MAC sensor chip consists of, a frame like substrate 1, a vibrating mass 2, two flexural resonators 3 and 4, and four flexural supports 8, 9, 10, and 11. This is a monolithic structure that can be formed in single crystal silicon wafers using established microlithography and micromachining techniques.

This structure is related to the right handed xyz coordinate system shown in FIG. 1. The proof mass 2 is driven by electrostatic forces that cause it to vibrate in the direction 5 that is coincident with the x axis. The flexural resonators 3 and 4 are oriented along the z axis. It is shown later that the rotation sensitive axis of this sensor is perpendicular to these directions and lies along the vector 6 coincident with the y axis. The acceleration sensitivity of the sensor is located along the z axis.

The silicon structure of FIG. 1 is bonded to two Pyrex glass or silicon caps 24 and 25 that are shown in FIG. 2. Both of these caps have proof mass wells 26 that are etched into the caps' surfaces. These wells are recessed an amount sufficient to allow for the vibrational motion of the proof mass perpendicular to the xy plane. The wells also contain metallic electrode patterns that are used to vibrate the proof mass 2 and the resonators 3 and 4. Electroplated feedthrough holes 35 are formed in the caps to make electrical contact to the inside of the chip. These feedthroughs have topside electrode patterns that can be used for wire bonding.

The caps are also fabricated from wafers and are bonded to the center silicon wafer before being diced into the rectangular chips. This makes it possible to use batch fabrication methods that permit the manufacturing of all the individual sensors on a single wafer assembly at one time. This greatly reduces the labor and cost of these devices.

B. ELECTRONICS DESIGN

The microchip of FIG. 2 is die bonded into a vacuum tight hybrid package and connected to the electronic signal processing system shown in FIG. 3. Item 12 represents an electronic oscillator that is used to drive the proof mass 2 at its resonant frequency. This is done through the metallic electrodes that are located on the microchip caps. This oscillator also provides a reference frequency 19 that is used by the signal electronics for synchronous detection of demodulated output signals 20 and 22, as will be described more fully below.

Items 13 and 14 are additional oscillators that are used to drive the individual flexural resonators 3 and 4. These resonators have natural resonant frequencies that are approximately equal and are much greater than the natural frequency of the proof mass. It is shown below that the frequencies of the resonators are modulated by the linear acceleration and Coriolis forces produced by the proof mass. This process is known as heterodyning or frequency modulation.

The frequency modulated output of each of these oscillators is sent to their respective demodulators, items 15 and 16, where the resonators' average frequencies are removed from the signals. The output of the demodulators is then sent to two dual stage detectors 17 and 18 to produce outputs that are proportional to linear acceleration and rotational velocity.

It is important to note that the resonators 3 and 4 have been placed at opposite ends of proof mass 2. This was done so that the acceleration and Coriolis forces applied to each resonator are equal in magnitude and opposite in sign. When the signals from each channel of the MAC sensor electronics are combined at the dual stage detectors 17 and 18, the parts of the signals that are proportional to each acceleration and rotation signal are added (to double the sensitivity) and the common mode parts are subtracted (to reduce measurement errors). The outputs 27 and 28 are, therefore, true differential signals that are proportional to the linear acceleration and angular rotational velocity that are applied to the sensor chip.

II. PRINCIPLES OF OPERATION

The micromachined acceleration and Coriolis (MAC) sensor is a highly integrated device that provides for the simultaneous, differential measurement of linear and angular motion using only one monolithic proof mass. Despite the multiplicity of functions, the MAC sensor offers a structural simplicity that is not found in earlier sensors of the same type. To explain its operation, the proof mass, resonator, and signal detection subsystems will be described separately. In particular, the propagation of the acceleration and rotational signals, as well as the measurement errors, through the sensor system will be discussed.

A. PROOF MASS FORCES

1. LINEAR ACCELERATION

The prime function of the proof mass is to apply forces to the MAC resonators that are related to the inertial motion of the sensor. One of these forces is produced by acceleration in the z direction. When the substrate is accelerated along this axis, the inertia of the proof mass produces a counterforce that is restrained by the resonators at each end. According to Newton's law, the force produced by linear acceleration is $$F_a = m_{pm} a_z \tag{1}$$

wherein $F_a$ is the linear acceleration force, $m_{pm}$ is the mass of the proof mass, and $a_z$ is the linear acceleration.

When the sensor is accelerated along the z axis, the proof mass produces a force in resonator 3 that is tensile, and a force is resonator 4 that is compressive.

2. ROTATIONAL CORIOLIS FORCE

The Coriolis "force" is actually an apparent acceleration attributed to a body that is in motion with respect to a rotating coordinate system. If the proof mass in FIG. 1 is vibrating in the direction 5, and, if the sensor substrate is rotating about the direction 6, then a Coriolis force will be produced in direction 7 which is simultaneously perpendicular to both the velocity and rotation vectors. This Coriolis force oscillates at the frequency of the proof mass and modulates the natural resonant frequency of the two resonators 3 and 4. Each of these resonators then produces a frequency modulated carrier signal that is sensed by the signal processing electronics shown in FIG. 3.

The magnitude of the Coriolis force that is imposed on the proof mass is the cross product of the proof mass velocity vector 5 and the coordinate rotation vector 6 and is given by $$F_c = 2m_{pm}v\Omega_y \quad (2)$$

wherein $F_c$ is the Coriolis force, $v$ is the velocity of the proof mass, and $\Omega_y$ is the inertial rotation velocity along the y-axis.

In order to evaluate this equation, it is necessary to compute the proof mass velocity. Since the proof mass 2 is harmonically driven by the oscillator 12, its equation of motion is given by $$x = x_{pm} \sin(\omega_{pm} t) \quad (3)$$

wherein x is the displacement of the proof mass, $\omega_{pm}$ is the resonant frequency of the proof mass, and $x_{pm}$ is the displacement magnitude of the proof mass. This equation is differentiated with respect to time to give the proof mass velocity.

$$v = \omega_{pm} x_{pm} \cos(\omega_{pm} t) \quad (4)$$

This result can be substituted into equation (1) to give $$F_c = 2m_{pm}\omega_{pm}x_{pm}\Omega_y \cos(\omega_{pm} t) \quad (5)$$

Equation (5) describes the magnitude of Coriolis force that is produced by the vibrating proof mass 2. It is directed along the z direction and oscillates at the frequency of the proof mass.

The Coriolis force is applied to both of the two resonators 3 and 4 that support the proof mass in the z direction. Assuming that the flexure supports 8, 9, 10, and 11 offer negligible stiffness in the z direction, then the force applied to the two resonators is $$F_{c3} = \frac{F_c}{2} \quad (6)$$

$$F_{c4} = \frac{F_c}{2} \quad (7)$$

wherein $F_{c3}$ is the Coriolis force applied to resonator 3, and $F_{c4}$ is the Coriolis force applied to resonator 4.

It should be noted that the resonators have been positioned so that the Coriolis force that is applied to each resonator is equal in magnitude but opposite in direction. For example, when resonator 3 is in tension, resonator 4 is in compression.

B. RESONATOR FREQUENCY MODULATION

1. SIGNAL ANALYSIS

The resonators 3 and 4 are flexurally mounted "beam like" structures that exhibit a natural mechanical resonance and a sensitivity to in-plane (z axis) mechanical forces. In the absence of an in-plane force each resonator vibrates at a natural resonance determined by the mass and stiffness of the structure. When an in-plane force is applied to the resonator, the frequency is changed at a rate that depends upon the buckling load of the structure. In particular, if the applied force is tensile, then the resonator's frequency increases. If the force is compressive, the frequency decreases. This frequency response is given by $$\omega = \omega_o + k_1 F_T + k_2 F_T^2 \quad (8)$$

wherein $\omega_o$ is the natural frequency of the resonator, $k_1$ is the linear frequency scale factor, $F_T$ is the total net force applied to the resonator along the z-axis, and $k_2$ is the nonlinear frequency scale factor.

The first term in this equation is the natural frequency of the resonator and is determined by the mass and stiffness of the structure. The second term of this equation, is the term that describes the force sensitivity of the resonator. The last term shown in equation (8), accounts for the nonlinearity of the resonator's force sensitivity. Additionally, higher order terms are predicted by beam theory, but are usually small enough that they can be ignored for most analyses.

The forces produced by the linear acceleration and rotational velocity are given by equations (1), (6), and (7). Substituting these into equation (8) gives $$\omega = \omega_o + \Delta\omega_a(t) + \Delta\omega_c(\omega_{pm}) + \Delta\omega_n(2\omega_{pm}) \quad (9)$$

wherein $\Delta\omega_a(t)$ is the frequency shift due to acceleration and is equal to $k_1 m_{pm} a_z$, $\Delta\omega_c(\omega_{pm})$ is the frequency shift due to rotation and is equal to $k_1 2 m_{pm} \omega_{pm} \Omega_y x_{pm} \cos(\omega_{pm} t)$, and $\Delta\omega_n(2\omega_{pm})$ is the frequency shift due to nonlinearity and is equal to $k_2(F_a + F_c)^2$.

Equation (9) shows the explicit time dependence of the various terms. In particular, the acceleration term and Coriolis term have separate time dependencies which will allow their separation in the signal processing scheme described later.

2. ERROR ANALYSIS

The resonators are also sensitive to additional parameters that are not part of the inertial motion to be measured. These additional parameters contribute to the sensor's noise and could contribute to measurement uncertainties. These error mechanisms are described by $$\Delta\omega_e = \Delta\omega_T + \Delta\omega_\epsilon + \Delta\omega_s \quad (10)$$

wherein $\Delta\omega_e$ is the frequency shift due to errors, $\Delta\omega_T$ is the frequency shift due to temperature, $\Delta\omega_\epsilon$ is the frequency shift due to substrate strain, $\Delta\omega_g$ is the frequency shift due to electrostatic gap changes, and $\Delta\omega_s$ is the frequency shift due to resonator strain.

The first term in equation (10) provides for the change in frequency caused by changes in resonator temperature. For silicon this term is linear in temperature and is defined by $$\Delta\omega_T = \alpha_T \omega_o T \quad (11)$$

wherein $\alpha_T$ is the temperature coefficient, and T is the temperature.

Other resonator materials, such as quartz, exhibit nonlinear terms that are too significant to ignore and would need to be included in this equation.

The second term in equation (11) describes the change in frequency caused by strain in the sensor substrate. This strain can be caused by mounting stress, by residual material stress generated during thermal fabrication cycles and sensor chip assembly, or by general long term aging. In particular, this term is defined by $$\Delta\omega_\epsilon = k_1 \epsilon_s E A_r \quad (12)$$

wherein $\epsilon_s$ is the substrate strain, E is the modulus of elasticity, and $A_r$ is the resonator cross sectional area.

Both equations (11) and (12) describe measurement errors that are relatively independent of time and have, at most, a very slow time variation.

The third term in equation (10) is an adjustment that must be made to account for the change in the resonator's electrostatic gap that occurs when the proof mass is oscillating in the x direction. Note that this term is 90 degrees out of phase with the proof mass motion and will eventually be eliminated by the signal processing electronics. This term is defined by $$\Delta\omega_g = \chi x \sin(\omega_{pm} t) \quad (13)$$

wherein $\chi$ is the electrostatic gap coefficient.

The last term in equation (10) accounts for a frequency modulation that is caused by stretching of the resonator when the proof mass moves in the x direction. This motion produces a tension in the resonator that is tensile for both directions of the x motion. As a result, the frequency shift caused by resonator stretching is proportional to the square of the proof mass displacement according to $$\Delta\omega_s = \gamma x^2 = 5\gamma x^2_{pm}(1 - \cos 2\omega_{pm} t) \quad (14)$$

wherein $\gamma$ is equal to $k_1 EA_s/(2L^2)$, and L is the length of the resonator.

Note that this last term has a time independent part and a part that oscillates at twice the proof mass frequency. This is because the resonator stretching is proportional to the square of the proof mass displacement.

3. RESONANT OSCILLATOR ANALYSIS

Equations (9) and (10) can now be combined to analyze the response of each resonator. Arbitrarily assigning resonator 3 to channel A and resonator 4 to channel B gives the following equations.

$$\omega_A = \omega_o + \Delta\omega_a(t) + \Delta\omega_c(\omega_{pm}) + \Delta\omega_n(2\omega_{pm}) + \Delta\omega_s \quad (15)$$

$$\omega_B = \omega_o - \Delta\omega_a(t) - \Delta\omega_c(\omega_{pm}) + \Delta\omega_n(2\omega_{pm}) + \Delta\omega_s \quad (16)$$

These equations describe the frequency output of each channel as modulated by the linear acceleration, rotational velocity, and assorted error mechanisms. The voltage outputs of each oscillator can also be determined. In particular, the voltage output of channel A is given by $$V_A = V_o (\cos(\omega_A + M_{1A} \cos(\omega_{pm} t) + M_2 \cos(\omega_{pm} t))) \quad (17)$$

wherein $V_o$ is the oscillator output voltage, $$\omega_A = \omega_o + \Delta\omega_a(t) + \Delta\omega_n(t) + \Delta\omega_T + \Delta\omega_c \quad (18)$$

$$M_{1A} = M_c + iM_g \quad (19)$$

$$M_c = \frac{|\Delta\omega_c|}{\omega_{pm}} \quad (20)$$

$$M_g = \frac{|\Delta\omega_g|}{\omega_{pm}} \quad (21)$$

$$M_2 = M_n + M_s \quad (22)$$

$$M_n = \frac{|\Delta\omega_n|}{2\omega_{pm}} \quad (23)$$

$$M_s = \frac{|\Delta\omega_s|}{2\omega_{pm}} \quad (24)$$

Similar equations are used for channel B, as follows $$V_B = V_o (\cos(\omega_B + M_{1B} \cos(\omega_{pm} t) + M_2 \cos(\omega_{pm} t))) \quad (25)$$

$$\omega_B = \omega_o - \Delta\omega_a(t) + \Delta\omega_n(T) + \Delta\omega_T + \Delta\omega_{6B} \quad (26)$$

$$M_{1B} = -M_c + M_g \quad (27)$$

Equations (15) through (27) now describe the output of both channels in terms of the signal terms and error terms. Both channels are similar and differ only in the signs that precede the signal terms. It is shown below, that all error terms are canceled by the differential dual stage nature of the MAC sensor geometry and electronic signal processing.

C. SIGNAL DEMODULATION

Each of the resonators 3 and 4 are connected to their own oscillators 13 and 14. Each oscillator, in turn, is connected to one of two signal processing paths which make up the separate channels of a dual stage electronic system. Since each signal path is identical, the description of the signal processing system can be covered by explaining one path only.

The oscillator 14 senses the instantaneous frequency of the resonator 3 and provides a feedback signal of equal frequency and phase to maintain the resonator's vibrational motion. This feedback signal can also be monitored by the signal processing electronics to determine the resonator' instantaneous frequency.

In normal operation, all indices of modulation (M) are maintained (by design) at a value much less than unity. According to angular modulation theory, the output of the oscillator can be divided into separate terms; the carrier wave operating at the resonator's unmodulated frequency and two sidebands operating at the sum and difference of the modulating frequencies. This process, known as heterodyning, transforms a signal at a low frequency (i.e., the proof mass frequency) into a band of frequencies centered around the higher frequency of the resonator.

The oscillator output is detected in the demodulator circuit 16. This circuit could be a phase locked loop (PLL) or another type of frequency discriminator circuit. In either case, the function of the demodulator is to identify the carrier frequency and separate it from the oscillator output. The output of the demodulator is the carrier signal with the frequency given by equation (18) for channel A and equation (26) for channel B. This output contains the linear acceleration signal as well as terms relating to the natural resonator frequency, thermal frequency shift, residual strain effects, and offsets caused by resonator stretching and nonlinearities.

The second output of the demodulator is a signal containing the time dependent terms that originally modulated the resonator. This output is an AC voltage given by $$V'_A = \alpha G(M_{1A} \sin(\omega_{pm} t) + M_2 \sin(\omega_{pm} t)) \quad (28)$$

for channel A and by $$V'_B = \alpha G(M_{1B} \sin(\omega_{pm} t) + M_2 \sin(\omega_{pm} t)) \quad (29)$$

for channel B wherein $\alpha$ is the frequency conversion coefficient (volts/hertz), and G is the system gain (volt/volt). This output contains the rotational velocity signal as well as error signals caused by gap fluctuations and resonator stretching.

D. DUAL CHANNEL DETECTION

Equations (15), (16), (28), and (29) are the outputs of the resonators after processing through both channels of the signal processing electronics. One pair of these (equations 15 and 16) describe the signals that are used to determine the sensor's linear acceleration. The remaining pair (equations 28 and 29) provide the rotational velocity.

In particular, the linear frequency signals (eq. 14 and eq. 15) are combined in the differential frequency counter 18. This circuit measures the frequency of each of it inputs and provides an output that is the difference of the inputs. This results in the linear output $$\omega_A - \omega_B = 2 \Delta\omega_a(t) = 2K_1 m_{pm} a_z(t) = \Delta\omega \quad (30)$$

wherein $$a_z(t) + \frac{\Delta \omega}{2k_1 m_{pm}} \quad (31)$$

This shows that the final output frequency is proportional to linear acceleration. The common mode error terms caused by the resonator's natural frequency, thermal shifts, residual stress, and resonator stretching have been compensated by the differential function of the dual channel counter 18.

The individual, single stage, Coriolis outputs of the MAC sensor are connected together with the proof mass reference signal 19 at the dual stage, synchronous detector 17. This circuit multiplies both Coriolis outputs by the proof mass reference signal to remove the time dependent cosine factors in equations (28) and (29). The only portions of these signals that are coherent and in phase with the proof mass reference signal are $$V''_A = \alpha G \Delta \omega_c \quad (32)$$

$$V''_B = -\alpha G \Delta \omega_c \quad (33)$$

Due to the differential nature of detector 17, its final output is $$|V''_A - V''_B| = |\Delta V''| = 2\alpha G |\Delta \omega_c| = 2\alpha G(2k_1 m_{pm} \omega_{pm} x_{pm} \Omega_y) \quad (34)$$

This is a DC voltage that is proportional to the rotational velocity and can be used to measure this quantity using $$\Omega_y = \frac{|\Delta V''|}{\beta} \quad (35)$$

wherein $$\beta = 4\alpha G k_1 m_{pm} \omega_{pm} x_{pm} \quad (36)$$

Once again, the differential function of this circuit has removed the error terms that are not coherent with the proof mass. The result is a Coriolis signal, the amplitude of which is proportional to rotational velocity and is free of common mode errors.

Equations (31) and (35) describe the final outputs of the MAC sensor. These equations are most accurate if resonators 3 and 4 are exactly identical and exhibit the same resonant frequencies and sensitivities. If, due to manufacturing tolerances and material variations, the resonators are not ideally matched, then equations (31) and (35) could be expanded into Taylor series that would use the frequencies or voltages of both stages. These expanded formulas can accurately account for small differences in resonator performance and can model the errors that would result from these differences.

E. PERFORMANCE ESTIMATES

Estimates of the performance of the MAC sensor can be calculated from the preceding analysis. For example, Table 1 lists values of MAC sensor parameters that are consistent with current micromachining and electronic design practices.

TABLE 1

PERFORMANCE ESTIMATES

| UNITS | SYMBOL | VALUE | |
|---|---|---|---|
| INERTIAL MOTION | | | |
| LINEAR ACCELERATION | $a_z$ | 100 | G |
| ROTATIONAL VELOCITY rad/sec | $\Omega$ | 3.49 | |
| PROOF MASS | | | |
| WIDTH | | .60 | cm |
| LENGTH | | .60 | cm |
| THICKNESS | | .05 | cm |
| MASS | $m_{pm}$ | .042 | gm |
| RESONANT FREQUENCY rad/sec | $\omega_{pm}$ | 31,400 | |
| DITHER AMPLITUDE microns | $X_{pm}$ | 1 | |
| RESONATOR | | | |
| NATURAL FREQUENCY rad/sec | $\omega_o$ | 624,500 | |
| FORCE SENSITIVITY rad/sec/dyne | $k_1$ | 16.90 | |
| SINGLE STAGE DEMODULATOR OUTPUT | | | |
| REFERENCE VOLTAGE | | 5 | volt |
| DEMODULATION COEFFICIENT volt/(rad/sec) | $\alpha$ | .0016 | |
| SYSTEM GAIN volt/volt | G | 200 | |
| DUAL STAGE SENSITIVITIES | | | |
| LINEAR ACCELERATION | | 111 | Hz/G |
| ROTATIONAL VELOCITY volt/(rad/sec) | | 1.42 | |

These parameters predict a full scale acceleration output of 11.1 Khz at an input of 100 G (19,600 cm/sec$^2$). The rotational velocity output would be 4.96 volts with an input of 200°/sec (3.49 rad/sec). This shows that both the linear acceleration and the rational velocity outputs provided by the MAC sensor are reasonable in magnitude and can be easily measured.

III. UNIQUE FEATURES

The micromachined acceleration and Coriolis sensor is a unique design that has several inherent advantages. All of these features stem from the geometry of the suspension system used to support the proof mass and resonator within the sensor chip.

1. SINGLE PROOF MASS DESIGN

The fact that only one proof mass is needed to produce differential outputs for both linear and angular measurements offers several benefits. The first is a reduction in size of approximately 2 to 1 relative to dual proof mass designs. This not only reduces the size of the final sensor chip but also increases the number of chips that can be arranged on a single fabrication wafer. This last effect can greatly reduce the cost of individual chips when produced in large quantities.

The use of only one proof mass also reduces power requirements needed to vibrate the proof mass when compared to dual proof mass devices. Not only is there less mass to move but there is no need for mechanical phase controlling linkages between separate proof masses.

There are important performance benefits that stem from a single proof mass design. These are related to the improved symmetry that can be achieved for differential, dual mode operation. In particular, measurement errors related to differences in proof mass temperature, vibration, and alignment do not occur in a single proof mass device since these differences do not exist.

2. SIMPLIFIED COMPACT DESIGN

The complexity of the suspension system shown in FIG. 1 differs from earlier approaches in the number and shape of the flexures needed to control proof mass and resonator motion. The MAC sensor uses fewer flexures and does not require the high aspect etching techniques needed to fabricate flexures that are long and narrow. As a result, the number of lithography masks and the difficulty of the micromachining process is reduced. The use of wide, short flexures also increases the strength of the structure since material stresses are reduced for these geometries.

Another benefit of the MAC design is a simplification of the vibrational modes inherent in the structure. The reduction in number and complexity of the various flexures reduces the number and increases the frequency separation of unwanted, parasitic modes. This reduces the effort needed to design the structure and improves the overall measurement performance.

3. PERPENDICULAR DITHER MOTION

The MAC sensor differs from earlier devices in that the dither motion of the proof mass is perpendicular to the wafer surface instead of parallel. This allows for greater precision in alignment of the forces that produce the dither motion and in the flexure structures that control this motion.

Alternate approaches rely upon external parts, such as magnets and pole pieces, that can effect the alignment of in-plane dither forces. These external parts are sensitive to their mounting structures and can shift or change due to handling and aging of the overall sensor assembly. These effects are reduced in the MAC geometry since the electrostatic plates that determine the perpendicular dither forces are an integral part of each MAC sensor chip.

Another advantage of perpendicular motion relates to the isolation of orthogonal modes of vibration. The frequency of the proof mass in the perpendicular direction is much lower than the in-plane directions. This means the isolation of these modes and the ability to eliminate unwanted in-plane dither motion is improved.

4. ADJUSTABLE ELECTROSTATIC DRIVE FREQUENCIES

Both the proof mass and resonators use electrostatic fields to produce their vibrational motion. Since the exact frequency of an electrostatic resonator can be adjusted by application of an external DC bias in these fields, it is possible to fine tune the proof mass and resonator frequencies after the sensor chip has been fabricated. This means that slight variations in frequency or electronic response caused by manufacturing tolerances can be corrected after fabrication. This is done by adjusting the DC biases applied to the MAC chips by its external electronics.

IV. ALTERNATE CONFIGURATIONS

Outlined below are several alternative configurations that the MAC sensor can take.

A. ALL SILICON SENSOR ASSEMBLY

The MAC sensor can be made from materials that are different than described above. In particular, the Pyrex caps 24 and 25 could be made from silicon. This would reduce the residual stresses caused by differences in thermal expansion between Pyrex and silicon. While the use of silicon caps might make the bonding and inspection of the chip more complicated, the design is compatible with both materials and final material selection may be dependent on the applications for which the chips is designed.

B. SINGLE AXIS SENSOR

It is possible for the MAC chip to measure linear and angular motions separately and to use the device as an individual accelerometer or Coriolis rotation sensor. Since the ability to measure linear acceleration is effected by the rotational measurement, it is possible to optimize the measurement of one quantity at the expense of the other. This device is compatible with those applications where separate acceleration and rotation sensors of better performance are beneficial.

C. FOUR AXIS MONOLITHIC SENSOR

Figure 4A:
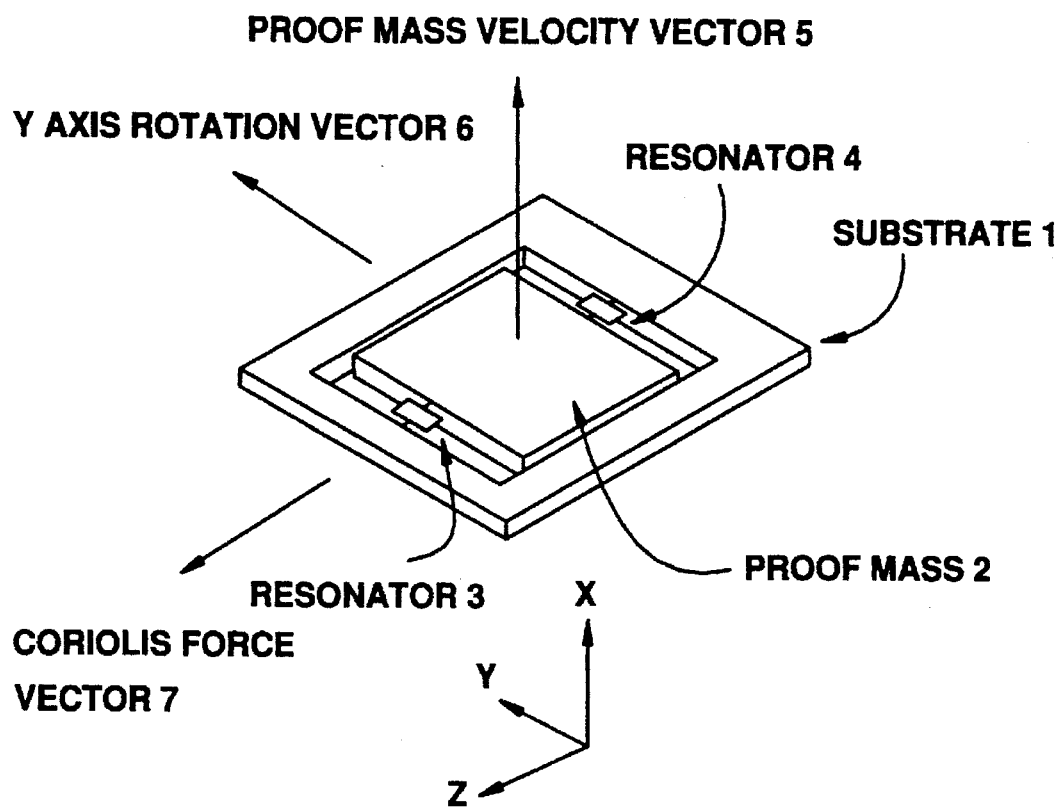
FIG. 4A is a top perspective view of a monolithic electromechanical structure of a four axis solid state silicon micromachined acceleration and Coriolis (MAC) sensor according to the present invention.
Figure 4B:
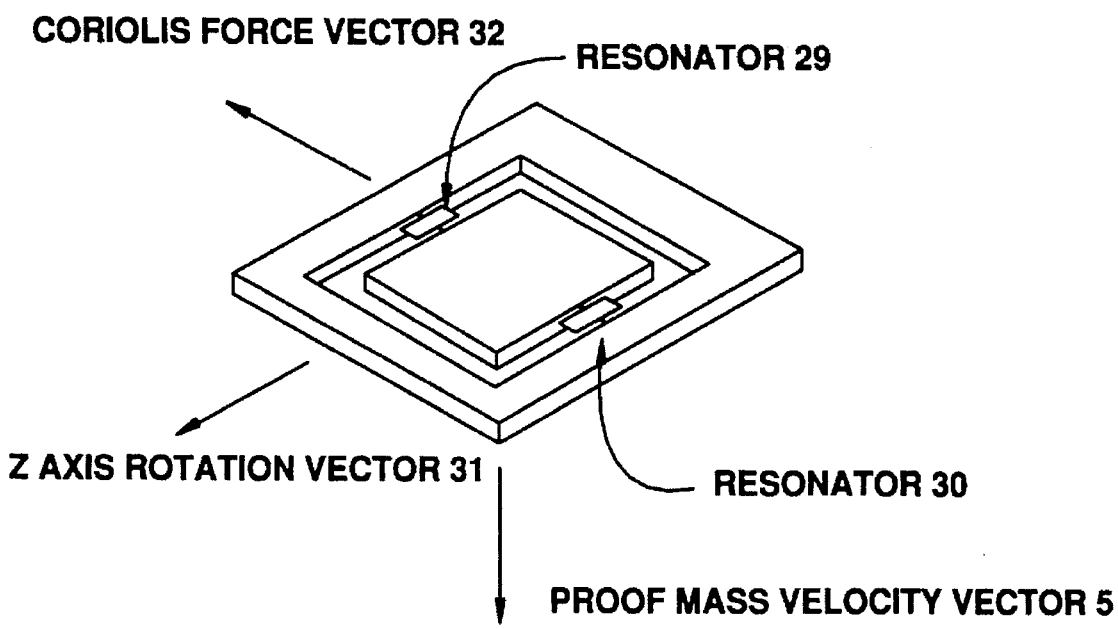
FIG. 4B is a bottom perspective view of the monolithic electromechanical structure shown in FIG. 4A.

The sensor geometry shown in FIG. 1 can be modified to produce a four axis sensor as shown in FIG. 4. Such a sensor has the flexures 8, 9, 10 and 11 as shown in FIG. 1 replaced with additional resonators 29 and 30. It can be seen from the symmetry of the chip that these additional resonators would exhibit a measurement capability for linear accelerations in the y axis and rotational velocities along the z axis. In this embodiment, one chip would function as two accelerometers and two rotation sensors for those applications where this would be beneficial.

D. SIX AXIS MONOLITHIC SENSOR

Figure 5A:
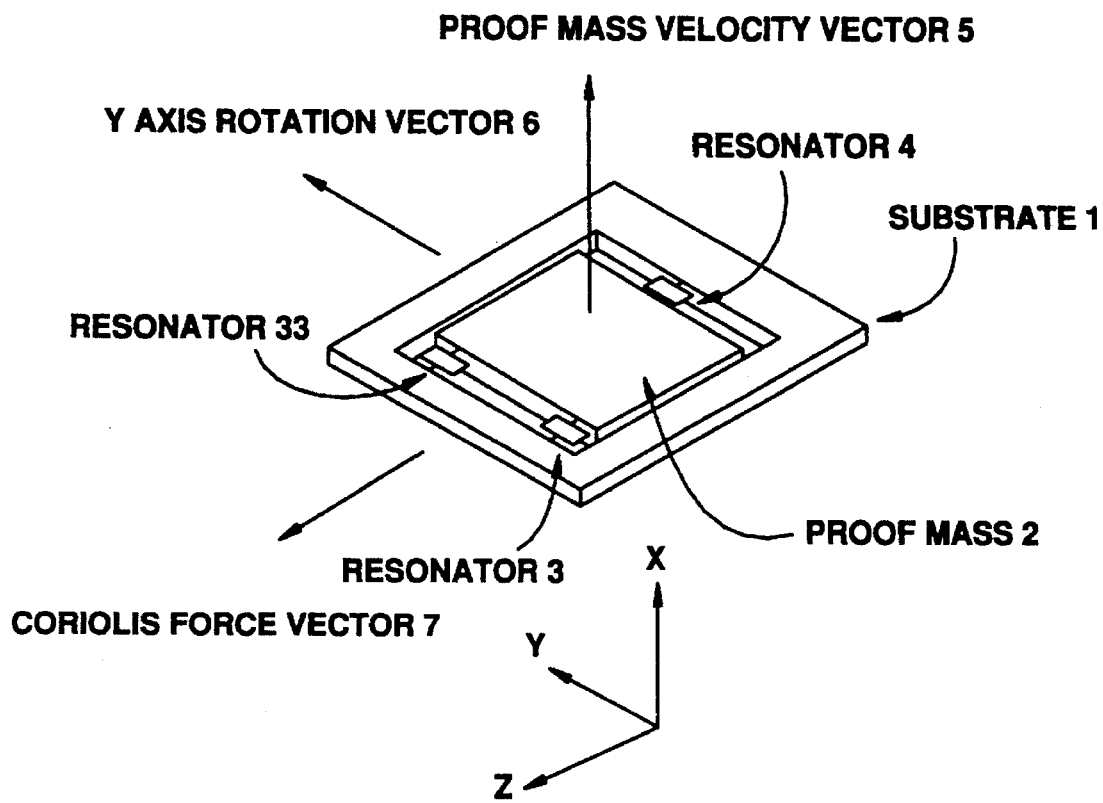
FIG. 5A is a top perspective view of a monolithic electromechanical structure of a six axis solid state silicon micromachined acceleration and Coriolis (MAC) sensor according to the present invention.
Figure 5B:
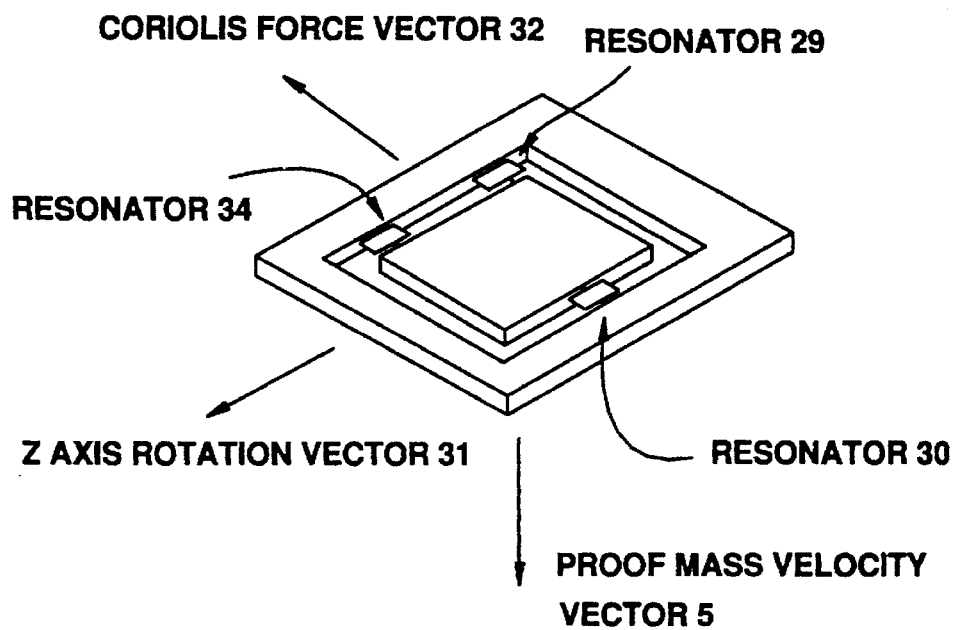
FIG. 5B is a bottom perspective view of the monolithic electromechanical structure shown in FIG. 5A.

The MAC sensor could be configured to operate as a complete six axis sensor if modified as shown in FIG. 5. This arrangement is similar to that shown in FIG. 4 with the addition of new resonators 33 and 34. These resonators have been positioned so that rotational acceleration about the x axis can be measured.

In particular, a rotational acceleration about the x axis would add a tensile stress to resonator 3 while producing a compressive stress in resonator 33. This rotational acceleration could be measured by taking the difference in the frequencies of these two resonators using the signal processing techniques discussed above. Measuring the frequency difference between resonators 29 and 34 would add to the sensitivity of this measurement and contribute to the rejection of errors common to this mode of measurement.

Measurements of linear acceleration along the x axis can be obtained by making precise measurements of the proof mass dither signal. If a DC bias voltage is applied between the proof mass electrodes on the chip caps 24 and 25, the average frequency of the proof mass becomes dependent on the proof mass's equilibrium position. Since this equilibrium position is effected by forces applied in the x direction, the linear acceleration along the x axis can be determined from the average proof mass frequency. In other words, measuring the reference frequency 19 coming from the proof mass oscillator 12 can determine the linear acceleration in the x direction.

With the present invention MAC sensor now fully described, it can thus be seen that the primary objective set forth above is efficiently attained and, since certain changes may be made in the above-described MAC sensor without departing from the scope of the invention, it is intended that all matter contained in the above description or shown in the accompanying drawings shall be interpreted as illustrative and not in a limiting sense.

What is claimed is:

1. A micromachined accelaration an Coriolis sensor for measuring linear and angular motion, said sensor comprising:

a substrate having a proof mass, a plurality of resonators formed therein, and a frame-like main body portion surrounding said proof mass and said plurality of resonators, said plurality of resonators being formed between said proof mass and said main body portion thereby supporting said proof mass within said main body portion, said proof mass having a first natural resonant frequency, and said plurality of resonators each having a second natural resonant frequency, wherein said proof mass is capable of applying linear acceleration and rotational Coriolis forces to said plurality of resonators in response to linear and angular motion of said sensor, wherein at least two of said plurality of resonators are disposed on opposite sides of said proof mass;

a first plurality of electrodes disposed adjacent said proof mass, said first plurality of electrodes providing electrostatic forces to said proof mass thereby causing vibration of said proof mass at said first natural resonant frequency;

a second plurality of electrodes disposed adjacent said plurality of resonators, said second plurality of electrodes providing electrostatic forces to said plurality of resonators thereby causing vibration of said plurality of resonators at said second natural resonant frequency;

electronic circuitry for exciting said first plurality of electrodes and said second plurality of electrodes and for sensing modulations in said second natural resonant frequency of said plurality of resonators caused by said linear acceleration and rotational Coriolis forces so as to produce acceleration and rotation signals indicative of said linear and angular motion of said sensor;

means for mounting said first and second plurality of electrodes adjacent said proof mass; and means for connecting said electronic circuitry to said first and second plurality of electrodes.

2. The sensor as defined in claim 1, wherein said first natural resonant frequency is smaller in magnitude than said second natural resonant frequency.

3. The sensor as defined in claim 1, wherein said means for mounting further comprises a pair of caps bonded to said substrate wherein said substrate is disposed between said pair of caps defining a sandwich assembly, and wherein said first plurality of electrodes and said second plurality of electrodes are disposed on at least one of said pair of caps and adjacent said substrate.

4. The sensor as defined in claim 3, wherein said pair of caps further comprises a top cap and a bottom cap, wherein said top cap is bonded to a top surface of said frame-like main body portion, wherein said bottom cap is bonded to a bottom surface of said frame-like main body portion, wherein said top and bottom caps have wells formed therein for allowing vibration of said proof mass at said first natural resonant frequency and for allowing vibration of said plurality of resonators at said second natural resonant frequency, wherein said wells are adjacent said proof mass and wherein said first and second plurality of electrodes are disposed within at least one of said wells.

5. The sensor as defined in claim 4, wherein said top cap has electroplated feedthrough holes formed therein for providing electrical connections between said electronic circuitry and said first plurality of electrodes and said second plurality of electrodes.

6. The sensor as defined in claim 1, wherein said electronic circuitry further comprises a proof mass oscillator for exciting said proof mass through said first plurality of electrodes.

7. The sensor as defined in claim 6, wherein said proof mass oscillator senses said first natural resonant frequency of said proof mass and provides a reference frequency output relating thereto.

8. The sensor as defined in claim 1, wherein said electronic circuitry further comprises at least one resonator oscillator for exciting said at least one resonator through said second plurality of electrodes.

9. The sensor as defined in claim 8, wherein said resonator oscillators sense modulations in said second natural resonant frequency of said plurality of resonators and provide frequency modulated outputs relating thereto.

10. The sensor as defined in claim 9, wherein said electronic circuitry further comprises demodulators for processing said frequency modulated outputs and for providing linear acceleration signals and rotational velocity signals.

11. The sensor as defined in claim 10, wherein said electronic circuitry further comprises a differential synchronous detector for processing said rotational velocity signals and for providing differential rotational velocity signals.

12. The sensor as defined in claim 10, wherein said electronic circuitry further comprises a differential frequency counter for processing said linear acceleration signals and for providing differential linear acceleration signals.

13. The sensor as defined in claim 1 further comprising at least one pair of opposing flexure supports connecting said proof mass to said frame-like main body portion thereby further supporting said proof mass within said frame-like main body portion.

* * * * *